United States Patent
Lee et al.

(10) Patent No.: US 8,848,994 B2
(45) Date of Patent: Sep. 30, 2014

(54) FETUS MODELING METHOD AND IMAGE PROCESSING APPARATUS THEREFOR

(71) Applicant: Samsung Electronics Co., Ltd., Suwon-si (KR)

(72) Inventors: Hyun-taek Lee, Seoul (KR); Hee-chul Yoon, Seoul (KR); Hae-kyung Jung, Seoul (KR); Jae-chool Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 13/739,143

(22) Filed: Jan. 11, 2013

(65) Prior Publication Data

US 2013/0177223 A1    Jul. 11, 2013

(30) Foreign Application Priority Data

Jan. 11, 2012  (KR) .................. 10-2012-0003458

(51) Int. Cl.
*G06K 9/00* (2006.01)
*G06T 7/00* (2006.01)
*G06T 17/00* (2006.01)
*A61B 8/00* (2006.01)

(52) U.S. Cl.
CPC .......... *G06T 7/0012* (2013.01); *G06K 9/00362* (2013.01); *G06T 17/00* (2013.01)
USPC .............................. 382/128; 382/291; 600/443

(58) Field of Classification Search
USPC ......... 382/100, 103, 107, 128–134, 154, 162, 382/168, 173, 181, 199, 203, 219, 232, 254, 382/274, 276, 287–291, 305, 312; 600/443, 600/437, 588; 378/4, 21, 28
See application file for complete search history.

(56) References Cited

U.S. PATENT DOCUMENTS

| | | | | |
|---|---|---|---|---|
| 7,850,625 B2 * | 12/2010 | Paltieli et al. | ................. | 600/588 |
| 2007/0081705 A1 * | 4/2007 | Carneiro et al. | ............... | 382/128 |
| 2009/0093717 A1 * | 4/2009 | Carneiro et al. | ............... | 600/443 |
| 2011/0196236 A1 | 8/2011 | Swamy et al. | | |
| 2011/0224546 A1 * | 9/2011 | Lee et al. | ...................... | 600/443 |
| 2011/0282199 A1 * | 11/2011 | Lee et al. | ...................... | 600/437 |

FOREIGN PATENT DOCUMENTS

KR   1020110102105 A   9/2011

OTHER PUBLICATIONS

International Search Report (PCT/ISA/220 & PCT/ISA/210) dated Apr. 29, 2013 from the International Searching Authority in application No. PCT/KR2013/000249.
Written Opinion (PCT/ISA/237) dated Apr. 29, 2013 from the International Searching Authority in application No. PCT/KR2013/000249.

* cited by examiner

*Primary Examiner* — Seyed Azarian
(74) *Attorney, Agent, or Firm* — Sughrue Mion, PLLC

(57) ABSTRACT

An image processing apparatus includes: an image receiver which receives a predetermined image obtained by photographing a fetus; and a controller which detects a head region and a torso region of the fetus from the predetermined image, and which models a shape of the fetus by using at least one of a first contoured shape corresponding to the detected head region, a second contoured shape corresponding to the detected torso region, a first axis that is the central axis of the detected head region, and a second axis that is the central axis of the detected torso region, to model the fetus so that biometric data of the fetus can be easily measured.

25 Claims, 7 Drawing Sheets

FETUS MODELING METHOD AND IMAGE PROCESSING APPARATUS THEREFOR

CROSS-REFERENCE TO RELATED PATENT APPLICATION

This application claims priority from Korean Patent Application No. 10-2012-0003458, filed on Jan. 11, 2012, in the Korean Intellectual Property Office, the disclosure of which is incorporated herein by reference in its entirety.

BACKGROUND

1. Field

Exemplary embodiments described herein relate to a fetus modeling method and an image processing apparatus therefor, and more particularly, to a method for generating a fetal shape model by modeling a fetal shape included in a predetermined image and an image processing apparatus therefor.

2. Description of the Related Art

Various medical technologies are used to diagnose a fetal state.

As a representative example, a medical practitioner captures an ultrasound image of a fetus and diagnoses a state of the fetus by using the acquired ultrasound image. An ultrasound system has non-invasive and nondestructive characteristics and thus is widely used in a medical field for obtaining information inside an object. The ultrasound system may provide a high-resolution image of the inside of an object to a medical practitioner in real-time without performing a surgical operation for directly incising and observing the object. Thus, the ultrasound system is widely used to diagnose a state of a fetus.

To diagnose a state of a fetus, visual reading of an image and measurement of biometric data may be used. As medical images for diagnosing a state of a fetus, ultrasound images, magnetic resonance imaging (MRI) images, three-dimensional camera images, and other suitable types of images may be used.

Measuring biometric data by using a medical image obtained by capturing an image of a fetus is manually achieved by a clinical expert, such as a medical practitioner. Thus, a deviation of a measurement error may increase based on corresponding levels of skills of clinical experts. In addition, due to the manual measurement operation, an examination procedure for diagnosing a state of a fetus cannot be standardized.

Thus, a method for modeling a fetal shape and an image processing apparatus therefor need to be provided in order to reduce a deviation of a measurement error, which may occur due to manual measurement, and to facilitate a convenient diagnosis of a state of a fetus.

SUMMARY

Exemplary embodiments provide a method for modeling a fetal shape in order to automatically measure biometric data of a fetus or detect a predetermined part, and an image processing apparatus therefor.

Exemplary embodiments also provide a fetus modeling method which is capable of easily acquiring biometric data of a fetus, and an image processing apparatus therefor.

According to an aspect of one or more exemplary embodiments, there is provided an image processing apparatus including: an image receiver which receives a predetermined image obtained by photographing a fetus; and a controller which detects a head region and a torso region of the fetus from the predetermined image, and which models a shape of the fetus by using at least one of a first contoured shape which corresponds to the detected head region, a second contoured shape which corresponds to the detected torso region, a first axis that is a central axis of the detected head region, and a second axis that is a central axis of the detected torso region.

The controller may include: a region detector which detects the head region and the torso region of the fetus from the predetermined image; and a fetus modeler which sets each of the first axis and the second axis and which models a shape of the fetus by using at least one of the first axis, the second axis, the first contoured shape, and the second contoured shape.

The first contoured shape may include a circle, and the second contoured shape may include an oval.

The region detector may acquire edge information from the predetermined image and detect the head region and the torso region of the fetus by using the acquired edge information.

The fetus modeler may model a fitting of the first contoured shape to the detected head region as a head of the fetus and model a fitting of the second contoured shape to the detected torso region as a torso of the fetus.

The fetus modeler may set the first axis by using at least one physical feature point included in the detected head region.

The at least one physical feature point may include at least one of a palatine bone, a nasal bone, a cheekbone, and a crown of a head of the fetus.

The fetus modeler may set a central axis of the first contoured shape, which is perpendicular to the palatine bone included in the head of the fetus, as the first axis.

The first contoured shape may include at least one of a circle, a symmetrical oval, and an asymmetrical oval, and the second contoured shape may include at least one of a circle, a symmetrical oval, and an asymmetrical oval.

The controller may acquire at least one piece of biometric data by using the modeled shape of the fetus.

The controller may measure at least one of a biparietal diameter (BPD), a head circumference (HC), a femur length (FL), a humerus length (HL), and a crown rump length (CRL) by using at least one of the modeled shape of the fetus, anatomical information relating to the fetus, and at least one physical feature point included in at least one of the detected head region and the detected torso region, and output a measurement result.

The controller may generate a final image by adding at least one of anatomical information relating to the fetus and at least one physical feature point included in at least one of the detected head region and the detected torso region to the modeled shape of the fetus.

The image processing apparatus may further include a display which displays at least one of the modeled shape of the fetus and the final image under a control of the controller.

The display may further include a user interface which generates a user interface screen which includes the final image. The user interface screen may further include a tool bar which is usable for measuring biometric data based on at least one of the anatomical information and the at least one physical feature point included in the final image.

The user interface screen may include a cursor which is usable for at least one of designating a predetermined region of the fetus and selecting a predetermined position of the fetus.

According to another aspect of one or more exemplary embodiments, there is provided a method for modeling a fetus, including: receiving a predetermined image obtained by photographing the fetus; detecting a head region and a torso region of the fetus from the predetermined image; and modeling a shape of the fetus by using at least one of a first contoured shape which corresponds to the detected head region, a second contoured shape which corresponds to the detected torso region, a first axis that is a central axis of the detected head region, and a second axis that is a central axis of the detected torso region.

BRIEF DESCRIPTION OF THE DRAWINGS

The above and other features and advantages will become more apparent by describing in detail exemplary embodiments with reference to the attached drawings in which.

DETAILED DESCRIPTION

As used herein, the term "and/or" includes any and all combinations of one or more of the associated listed items. Expressions such as "at least one of," when preceding a list of elements, modify the entire list of elements and do not modify the individual elements of the list.

In general, to diagnose a state of a fetus, a medical practitioner manually measures biometric data for each of selected parts of the human body by using an image obtained by photographing the fetus. Alternatively, the biometric data may be measured by referring to training-based statistical data for each of selected parts of the human body.

According to a particular method for measuring biometric data, only biometric data existing in a predetermined part of the human body is measured, and in order to measure biometric data relating to another part of the human body, training corresponding to the another part of the human body should be performed, and statistical data should be collected by repeating the training.

Hereinafter, to automatically measure biometric data without individual training for each respective part of the human body, a method for modeling a shape of a fetus and an image processing apparatus therefor are described in detail with reference to the accompanying drawings.

Figure 1:
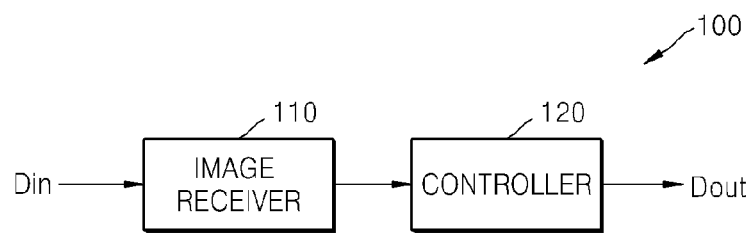
FIG. 1 is a block diagram of an image processing apparatus, according to an exemplary embodiment.

FIG. 1 is a block diagram of an image processing apparatus 100, according to an exemplary embodiment.

Referring to FIG. 1, the image processing apparatus 100 includes an image receiver 110 and a controller 120.

The image receiver 110 receives a predetermined image Din obtained by photographing a fetus, wherein the predetermined image Din may include at least one of an ultrasound image, a magnetic resonance imaging (MRI) image, a three-dimensional (3D) camera image, and any other suitable type of image.

The controller 120 detects head and torso regions from the predetermined image Din, which is transmitted by the image receiver 110 to the controller 120. In addition, the controller 120 models a shape of the fetus by using at least one of a first spherical shape which corresponds to the detected head region of the fetus, a second spherical shape which corresponds to the detected torso region of the fetus, a first axis that is a central axis of the detected head region of the fetus, and a second axis that is a central axis of the detected torso region of the fetus. In addition, the controller 120 may output the modeled shape of the fetus in the form of image data Dout.

Figure 2:
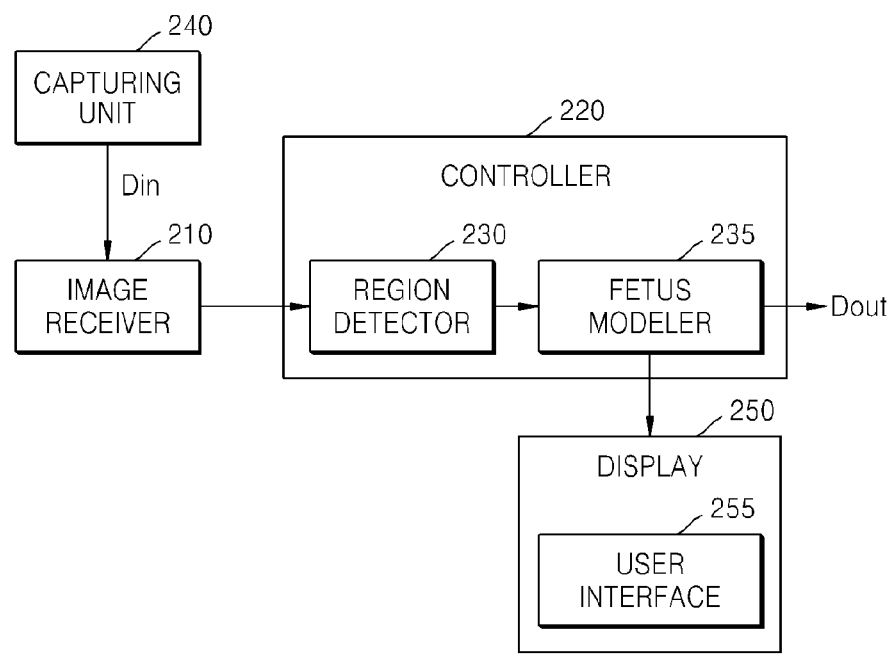
FIG. 2 is a block diagram of an image processing apparatus, according to another exemplary embodiment.

FIG. 2 is a block diagram of an image processing apparatus 200, according to another exemplary embodiment.

Referring to FIG. 2, the image processing apparatus 200 includes an image receiver 210 and a controller 220. In addition, the image processing apparatus 200 may further include at least one of a capturing unit 240 and a display 250. In the image processing apparatus 200, the image receiver 210 and the controller 220 respectively correspond to the image receiver 110 and a controller 120 of the image processing apparatus 100, and thus, a description thereof is not repeated.

The capturing unit 240 captures an image of a fetus. In detail, the capturing unit 240 includes a medical image capturing device (not shown) for photographing the body of the fetus, such as, e.g., at least one of an ultrasound capturing device, an MRI capturing device, a 3D camera device, and/or any other suitable device for capturing an image. In addition, the capturing unit 240 may photograph a predetermined cross-section of the fetus from which biometric data can be measured. For example, the capturing unit 240 may generate an image Din by photographing a mid-sagittal plane of the fetus. Although FIG. 2 illustrates that the capturing unit 240 is included in the image processing apparatus 200, the capturing unit 240 may be separate from the image processing apparatus 200.

The image receiver 210 receives the image Din generated by the capturing unit 240. In addition, the image receiver 210 transmits the received image Din to the controller 220. The image Din received by the image receiver 210 will now be described in detail with reference to FIG. 3.

Figure 3:
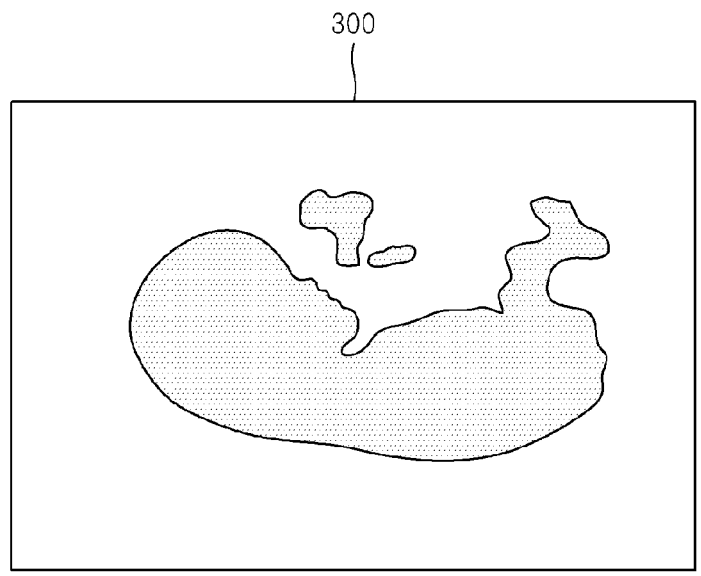
FIG. 3 is illustrates a predetermined image obtained by photographing a fetus.

FIG. 3 illustrates a predetermined image 300 which is obtained by photographing a fetus. FIG. 3 illustrates a case in which the image (Din) 300 is an ultrasound image. In addition, the image 300 which is obtained by photographing a predetermined cross-section of the fetus is illustrated.

Referring to FIG. 3, the image 300 may include an image which is obtained by photographing the whole body of the fetus. In addition, the image 300 may include, for example, an image obtained by photographing a mid-sagittal plane of the fetus.

Referring back to FIG. 2, the controller 220 may include a region detector 230 and a fetus modeler 235.

The region detector 230 detects a head region and a torso region of the fetus from the received image Din. In detail, the region detector 230 separately detects each of the head region and the torso region of the fetus from the image Din.

In more detail, the region detector 230 may acquire edge information from the image Din and detect the head region and the torso region of the fetus from the acquired edge information. The edge information may include, for example, information which indicates an outer boundary of the body of the fetus, e.g., the head or torso region, in the image Din.

Figure 4:
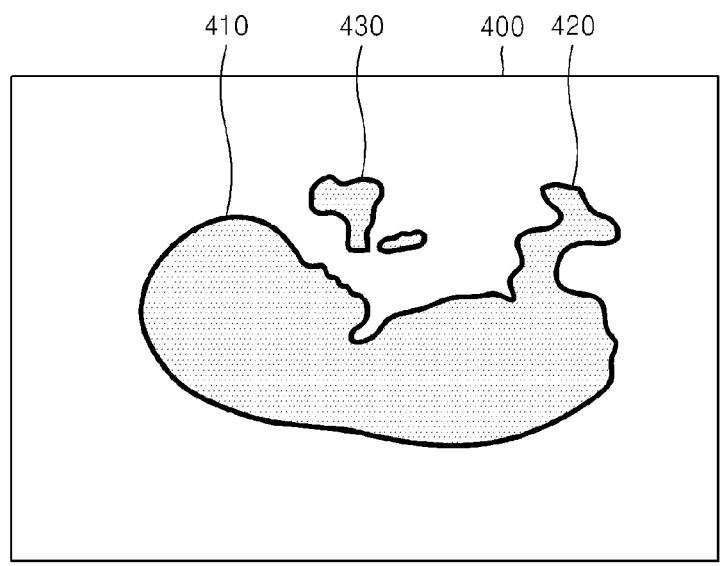
FIG. 4 is an image which illustrates an operation of detecting head and torso regions of a fetus by using a controller in the image processing apparatus of FIG. 2.

FIG. 4 is an image 400 which illustrates an operation of detecting head and torso regions of a fetus by using the controller 220 of FIG. 2.

Referring to FIG. 4, the image 400 corresponds to the image Din received and output by the image receiver 210, and illustrates an image which is obtained by photographing a mid-sagittal plane of the fetus.

The region detector 230 may generate an edge image (not shown) by Hough-transforming the image Din. The edge image is achieved by using boundary lines existing in the image Din. The region detector 230 may acquire the boundary of the head and torso regions of the fetus from the generated edge image. Although a case where the Hough transform is used as a method for extracting the boundary of the fetus has been described as an example, other boundary extracting methods may be used.

Referring to FIG. 4, the region detector 230 detects boundaries 410, 420, and 430 which are included in the image 400. In FIG. 4, the boundary 410 indicates a boundary of the head and torso regions of the fetus, the boundary 430 indicates a boundary of an arm of the fetus, and the boundary 420 indicates a boundary of a leg of the fetus.

The region detector 230 may acquire edge information relating to the image 400, and may detect the head region and the torso region of the fetus by using the acquired edge information. In detail, the region detector 230 may detect boundary lines existing in the image 400 by using the Hough transform and detect the head region and the torso region of the fetus based on the edge information that relates to the boundary lines.

The fetus modeler 235 may model a shape of the fetus by using a first contoured shape which corresponds to the detected head region of the fetus and a second contoured shape which corresponds to the detected torso region of the fetus. The first contoured shape may include at least one of a circle, a symmetrical oval and an asymmetrical oval. In addition, the second contoured shape may include at least one of a circle, a symmetrical oval and an asymmetrical oval. In detail, the first contoured shape may be a circle, and the second contoured shape may be an oval. A fetal shape modeling operation which is executable by using the fetus modeler 235 will now be described in detail with reference to FIGS. 5 and 6.

Figure 5:
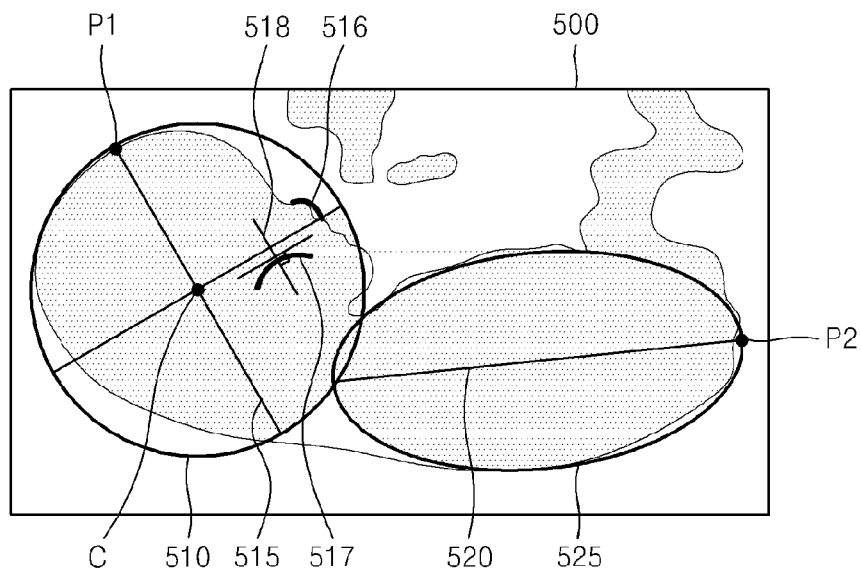
FIG. 5 is an image which illustrates an operation of modeling a shape of a fetus by using the controller in the image processing apparatus of FIG. 2.

FIG. 5 is an image 500 which illustrates an operation of modeling a shape of a fetus by using the controller 220 of FIG. 2. The image 500 of FIG. 5 may equivalently correspond to the image 400 of FIG. 4 and may include an image in which the respective boundary of each of a head region and a torso region of a fetus is shown by detecting the head and torso regions of the fetus by using the region detector 230.

In detail, referring to FIG. 5, the fetus modeler 235 acquires a first contoured shape 510 by performing a fitting with respect to the head region detected by the region detector 230. In addition, the fetus modeler 235 acquires a second contoured shape 525 by performing a fitting with respect to the torso region detected by the region detector 230. The fetus modeler 235 may model the first contoured shape 510 as the head of the fetus and model the second contoured shape 525 as the torso of the fetus.

In detail, when a least-squares method is applied to the head and torso regions of the fetus, which are detected by the region detector 230, the contoured shapes which correspond to the respective fittings of the detected head and torso regions may be acquired.

FIG. 5 illustrates a case where the first contoured shape 510 is a circle, and the second contoured shape 525 is a symmetrical oval.

In addition, the fetus modeler 235 may set a first axis 515 by using at least one physical feature point included in a fetal head. The at least one physical feature point may include, for example, a palatine bone 517, a nasal bone 516, a cheekbone (not shown), and the crown P1 of the head.

In detail, the fetus modeler 235 may set a direct line, which is a central axis of the first contoured shape 510 and passes through the crown P1 of the head, as the first axis 515.

In addition, the fetus modeler 235 may set the central axis of the first contoured shape 510, which is perpendicular to the palatine bone 517 included in the head, as the first axis 515. In FIG. 5, a direct line 518 perpendicular to the palatine bone 517 is parallel to the first axis 515.

In addition, the fetus modeler 235 may set a long axis 520 of the oval 525 which is fitted to the detected torso region of the fetus as a second axis. A point P2 of contact between the oval 525 and the second axis 520 may be a rump of the fetus.

Figure 6:
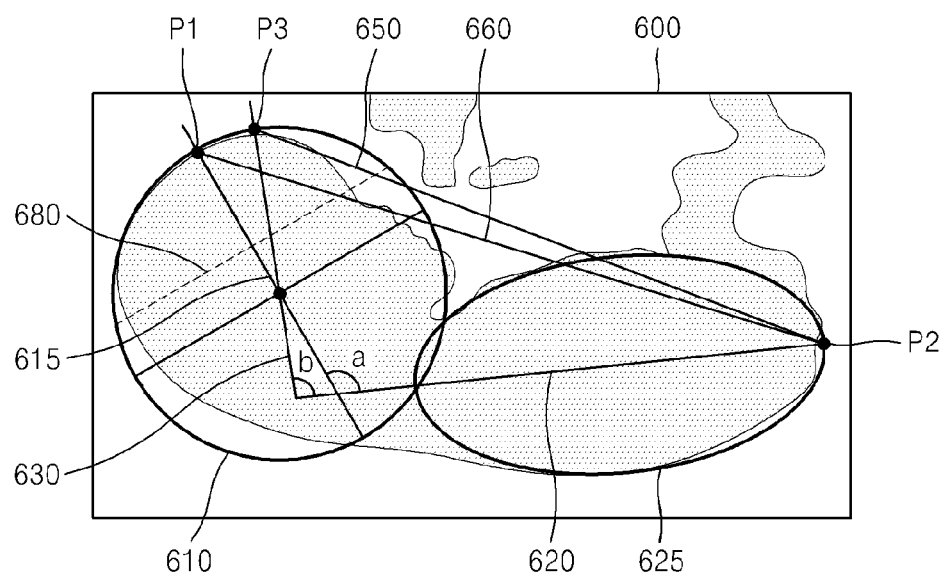
FIG. 6 is an image which illustrates another operation of modeling a shape of a fetus by using the controller in the image processing apparatus of FIG. 2.

FIG. 6 is an image 600 which illustrates another operation of modeling a shape of the fetus by using the controller 220 of FIG. 2. A first contoured shape 610, a second contoured shape 625, a first axis 615, and a second axis 620 of FIG. 6 respectively correspond to the first contoured shape 510, the second contoured shape 525, the first axis 515, and the second axis 520 of FIG. 5, and thus, a description thereof is not repeated.

The controller 220 may acquire at least one piece of biometric data by using a modeled shape of the fetus. The biometric data may include, for example, at least one of a crown rump length (CRL), a biparietal diameter (BPD), a head circumference (HC), an abdominal circumference (AC), a femur length (FL), a humerus length (HL), and/or any other suitable biometric quantity as bio recognition values for diagnosing a physical state of a fetus. In detail, the acquisition of the biometric data may be performed by using the fetus modeler 235. In addition, the controller 220, e.g., the fetus modeler 235, may output the acquired biometric data.

Referring to FIG. 6, the controller 220, e.g., the fetus modeler 235, may determine whether an angle a between the first axis 615 and the second axis 620, which is equivalent to an angle between the head of the fetus and the torso of the fetus, is within a normal range. A reference value for determining the normal range may be set by using statistical data. For example, the angle a between the first axis 615 and the second axis 620 may vary according to a crouching pose of the fetus, and the reference value for determining the normal range may be set based on statistical data relating to a general crouching pose of the fetus.

If the angle a between the first axis 615 and the second axis 620 is within the normal range, the controller 220, e.g., the fetus modeler 235, may measure, for example, a distance between a point P1 of contact between the first axis 615 and the first spherical shape 610 and a point P2 of contact between the second axis 620 and the second spherical shape 625 as a CRL 660.

In detail, if the angle between the head and the torso is not within the normal range, a measured CRL value may be inaccurate. For example, if the fetus crouches excessively, a small CRL value is measured, which value is likely to be smaller than a correct CRL value; and if the fetus stretches out, a large CRL value is measured, which value is likely to be larger than a correct CRL value. Thus, when the fetus crouches excessively or stretches out, it is not proper to calculate a gestational age (GA) that may be used for diagnosing a state of the fetus. Accordingly, the controller 220, e.g., the fetus modeler 235, may measure the CRL 660 by using the modeled fetal shape only if the angle a is within the normal range.

In addition, if the angle between the head and the torso is not within the normal range, the controller 220, e.g., the fetus modeler 235, may adjust the angle a between the first axis 615 and the second axis 620 to be a value which falls within the normal range. For example, in the modeled fetal shape, when the fetus stretches out, a value of the angle a may be reduced. Referring to FIG. 6, a corrected first axis 630 which is obtained by correcting the original first axis 615 may be set. Accordingly, an angle b between the corrected first axis 630 and the second axis 620 may be determined.

According to a fetal shape model having the reset angle b, a CRL value is measured as being equivalent to a distance 650 between a point P3 and the point P2.

Figure 7:
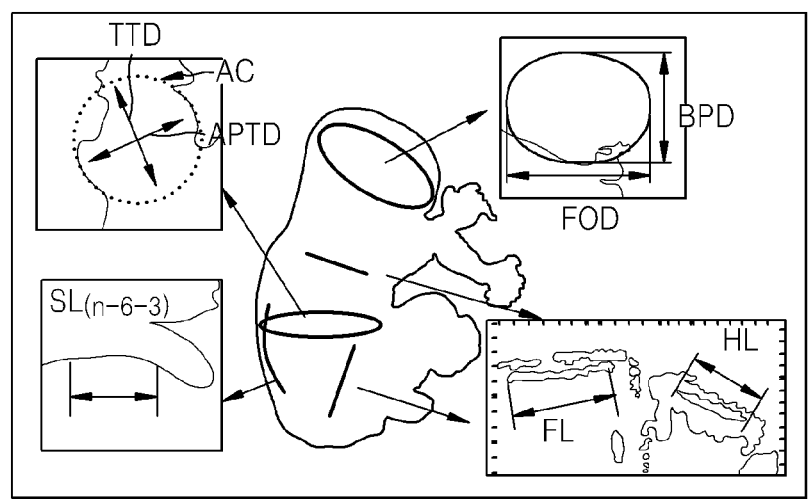
FIG. 7 is an image which illustrates biometric data which may be used to diagnose a state of a fetus.

FIG. 7 is an image which illustrates biometric data which may be used to diagnose a state of a fetus.

Referring to FIG. 7, examples of biometric data which may be used to diagnose a state of the fetus include a transverse thoracic diameter (TTD), an AC, an anterior posterior thoracic diameter (APTD), a BPD, an FL, and/or any other suitable biometric data relating to a fetus, as shown in FIG. 7.

The controller 220, e.g., the fetus modeler 235, may match a modeled fetal shape as shown in FIG. 5 or 6 with positions at which biometric data is measurable, and then measure the biometric data at the matching positions. The positions at which biometric data is measurable may be obtained by using statistical data which indicates positions at which predetermined biometric data is measurable with respect to the body of the fetus.

For example, according to the statistical data, when an HC of the fetus is most frequently measured by using a cross-section 680 as shown in FIG. 6, a circumference of the first contoured shape 610 may be acquired as an HC value by using the cross-section 680. In addition, when the head boundary detected by the region detector 230 differs from the first contoured shape 610, the controller 220 may correct the HC value by taking the difference into account.

The controller 220 may generate a final image by adding at least one of anatomical information relating to the fetus and at least one physical feature point which is included in at least one of the detected head region and the detected torso region to the modeled shape of the fetus. The anatomical information may include fetal body point information, fetal biometric data, and/or any other suitable anatomical information relating to the fetus.

The display 250 displays a predetermined screen under a control of the controller 220. In detail, the display 250 may display at least one of the modeled shape of the fetus and the final image. The display 250 may further display a user interface screen which includes a predetermined tool bar in addition to the modeled shape of the fetus and/or the final image.

The display 250 may include a user interface 255. The user interface 255 generates a user interface screen which includes a screen to be provided to a user, data, and/or a tool bar via which the user can input predetermined data, under a control of the controller 220. In addition, the user interface 255 may receive user data, a request, and/or any other user-generated input via the user interface screen. In detail, the user interface 255 may generate a user interface screen which includes the final image.

The user interface screen generated by the user interface 255 may be displayed via a display panel (not shown) which is included in the display 250.

The user interface screen which includes the final image or which includes both of the final image and the tool bar will now be described in detail with reference to FIG. 8.

Figure 8:
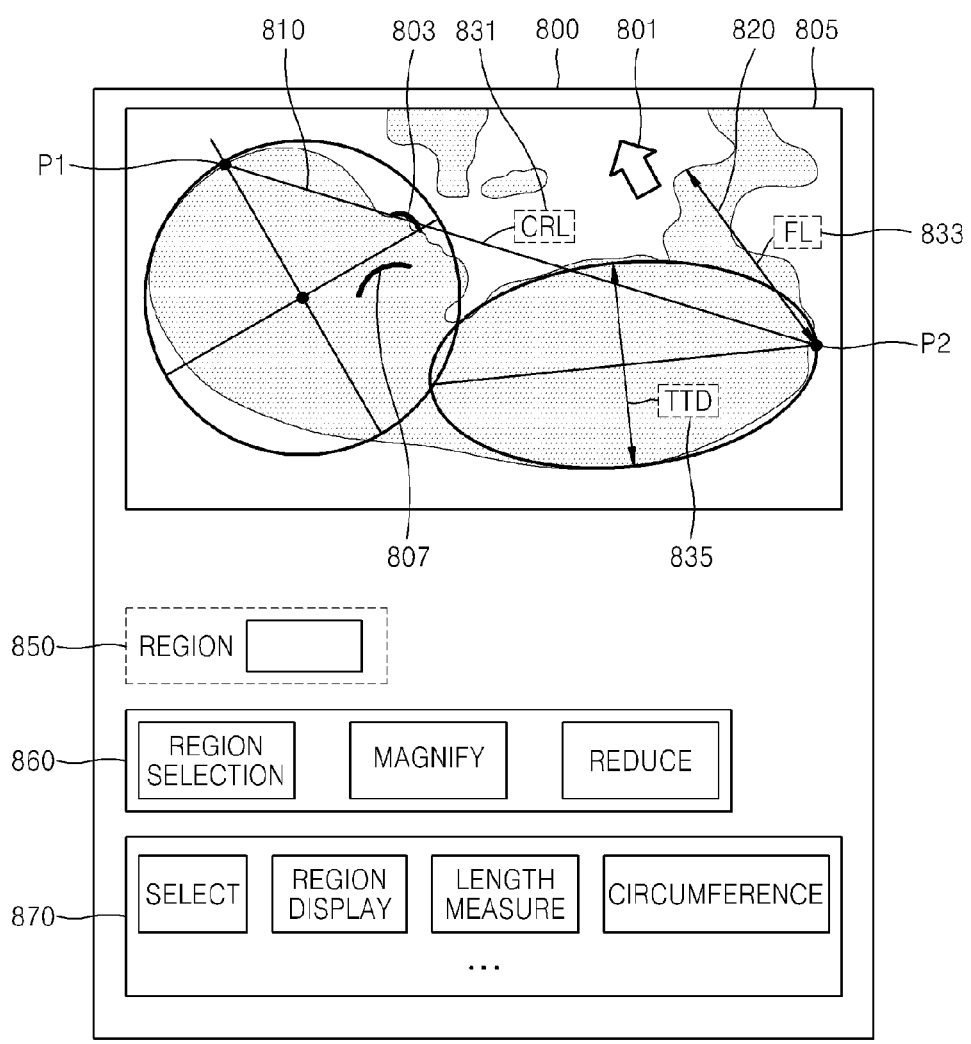
FIG. 8 illustrates a screen output by a display in the image processing apparatus of FIG. 2.

FIG. 8 illustrates a screen which is output by the display 250 of FIG. 2.

Referring to FIG. 8, a user interface screen 800 may include a final image 805. The final image 805 includes a modeled shape of a fetus, and may further include at least one piece of biometric data, such as a CRL 831, an FL 833, a TTD 835, and/or any other suitable biometric data, in addition to the modeled fetal shape. The final image 805 may include marks of anatomical information, such as, for example, at least one of a nasal bone tip 803, a palatine bone 807, and/or any other suitable anatomical information relating to the fetus, in addition to the modeled fetal shape.

The user interface screen 800 may further include one or more tool bars 860 and 870. In addition, the user interface screen 800 may further include a data region 850 in which at least one of anatomical information and a physical feature point which corresponds to a point indicated by a cursor 801, which is included in the final image 805, is displayed.

In addition, the user interface screen 800 may include the cursor 801, which is usable for designating a predetermined region of a fetus and/or for selecting a predetermined position of the fetus. A user may select a partial body region or a predetermined position of the fetus on the final image 805 by using the cursor 801.

For example, the user interface 255 receives information regarding a point selected by the cursor 801. Accordingly, the controller 220 may control at least one of anatomical information and a physical feature point which corresponds to the selected point information to be displayed on the user interface screen 800, e.g., on the data region 850. For example, when the cursor 801 is located at the point 803, and point information selected by the cursor 801 is transmitted to the controller 220, the wording "region: nasal bone tip" may be displayed on the data region 850.

As another example, the user interface screen 800 may include the tool bar 860, which is usable for selecting, magnifying, or reducing a predetermined region. For example, the user may click a "region selection" key which is included in the tool bar 860, and then select a predetermined region by using the cursor 801. Accordingly, the user interface 255 may receive a request for selecting the predetermined region and then transmit the received request to the controller 220. The controller 220 may separately store an image which corresponds to the selected predetermined region, or may redisplay the selected predetermined region as a full screen, in response to the request.

In addition, the user interface screen 800 may include the tool bar 870, which is usable for measuring biometric data. In detail, the user interface screen 800 may include the tool bar 870 which is usable for measuring predetermined biometric data which is based on anatomical information (e.g., the nasal bone tip 803 and the palatine bone 807 and/or at least one physical feature point (e.g., P1: crown and P2: rump) which is included in the final image 805.

For example, when the user pushes a "select" key which is included in the tool bar 870, the controller 220 may control a list (not shown) of at least one piece of biometric data, which can be photographed using the final image 805, to be displayed. In addition, when the user selects at least one item included in the biometric data list, the controller 220 may measure at least one piece of biometric data which corresponds to the selected at least one item, and then display a measurement result on the user interface screen 800.

As another example, when the user pushes the "select" key included in the tool bar 870, the controller 220 may control a menu (not shown) which provides user prompts for inputting information relating to biometric data to be measured to be displayed. When the user inputs information relating to predetermined biometric data via the menu, the controller 220 may measure the corresponding biometric data, and then display a measurement result on the user interface screen 800.

As another example, when the user pushes a "length measure" key which is included in the tool bar 870 and then selects two points by using the cursor 801, the controller 220 may measure a distance between the two selected points, and then display a measurement result on the user interface screen 800, in response to the user input.

As another example, when the user pushes a "circumference" key which is included in the tool bar 870 and selects two points by using the cursor 801, the controller 220 may measure a circumference of a cross-section between the two selected points, and then display a measurement result on the user interface screen 800, in response to the user input.

Figure 9:
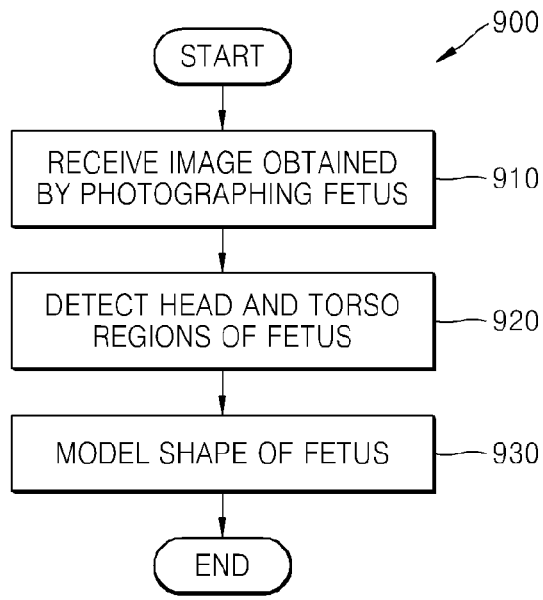
FIG. 9 is a flowchart which illustrates a method for modeling a fetus, according to an exemplary embodiment.

FIG. 9 is a flowchart which illustrates a method 900 for modeling a fetus, according to an exemplary embodiment. The method 900 has the same technical spirit as the image processing apparatus 100 or 200 according to one or more exemplary embodiments, which have been described above with reference to FIGS. 1 to 8. Thus, a description provided with respect to FIGS. 1 to 8 is not repeated. In addition, hereinafter, the method 900 is described with reference to the image processing apparatus 200 of FIG. 2.

Referring to FIG. 9, in operation 910, an image Din obtained by photographing a fetus is received. Operation 910 may be performed by using the image receiver 210.

In operation 920, a head region and a torso region of the fetus are detected from the image Din received in operation 910. Operation 920 may be performed by using the region detector 230.

In detail, in operation 920, edge information may be acquired from the received image Din, and each of the head region and the torso region of the fetus may be separately detected by using the edge information.

In operation 930, a shape of the fetus is modeled by using at least one of a first contoured shape which corresponds to the head region detected in operation 920, a second contoured shape which corresponds to the torso region detected in operation 920, a first axis that is a central axis of the detected head region, and a second axis that is a central axis of the detected torso region. Operation 930 may be performed by using the fetus modeler 235.

In detail, in operation 930, the first contoured shape may be determined by performing a fitting with respect to the detected head region, and thusly may be modeled as the head of the fetus, and the second contoured shape may be determined by performing a fitting with respect to the detected torso region, and thusly may be modeled as the torso of the fetus.

In addition, operation 930 may further include an operation (not shown) of setting the first axis by using at least one physical feature point included in the detected head region. The at least one physical feature point may include at least one of a palatine bone, a nasal bone, a cheekbone, and the crown of the head of the fetus. In addition, the operation of setting the first axis may further include an operation (not shown) of setting the central axis of the first contoured shape which is perpendicular to the palatine bone as the first axis.

Figure 10:
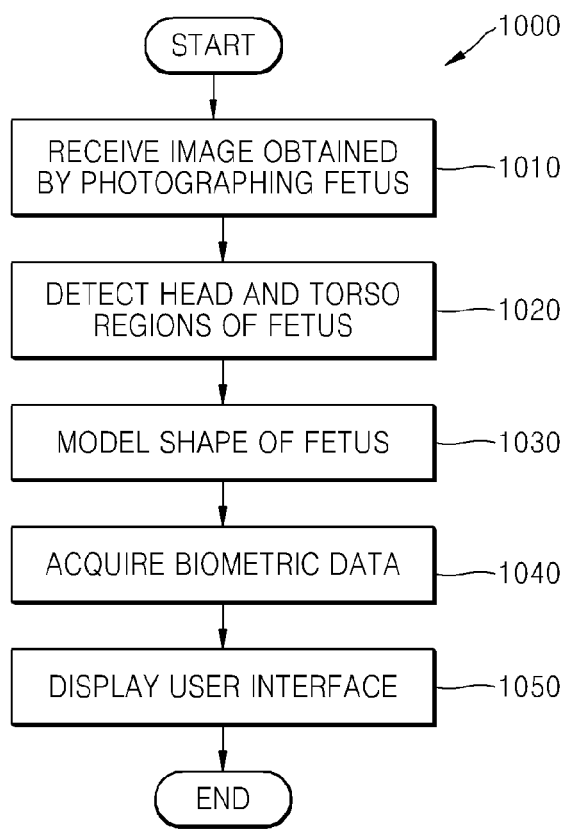
FIG. 10 is a flowchart which illustrates a method for modeling a fetus, according to another exemplary embodiment.

FIG. 10 is a flowchart which illustrates a method 1000 for modeling a fetus, according to another exemplary embodiment. The method 1000 has the same technical spirit as the image processing apparatus 200 according to another exemplary embodiment, which has been described above with reference to FIGS. 2 to 8. Thus, a description provided with respect to FIGS. 2 to 8 is not repeated. In addition, hereinafter, the method 1000 is described with reference to the image processing apparatus 200 of FIG. 2. In addition, because each of operations 1010, 1020, and 1030 of the method 1000 of FIG. 10 respectively corresponds to operations 910, 920, and 930 of the method 900 of FIG. 9, a description thereof is not repeated.

The method 1000 may further include at least one of operations 1040 and 1050, as compared with the method 900.

Referring to FIG. 10, after operation 1030, in operation 1040, at least one piece of biometric data is acquired by using a shape of a fetus which is modeled in operation 1030. Operation 1040 may be performed by using the controller 220.

In detail, in operation 1040, at least one of a BPD, an HC, an FL, an HL, and a CRL may be acquired by using at least one of the shape of the fetus which is modeled in operation 1030, anatomical information relating to the fetus, and at least one physical feature point relating to the fetus.

In operation 1050, a user interface screen is output after performing at least one of operation 1030 and operation 1040. Operation 1050 may be performed by using the display 250, in particular, the user interface 255.

In detail, in operation 1050, a user interface screen which includes values which relate to the biometric data acquired in operation 1040 may be displayed. In addition, in operation 1050, a user interface screen which includes the shape of the fetus which is modeled in operation 1030 may be displayed.

Figure 11:
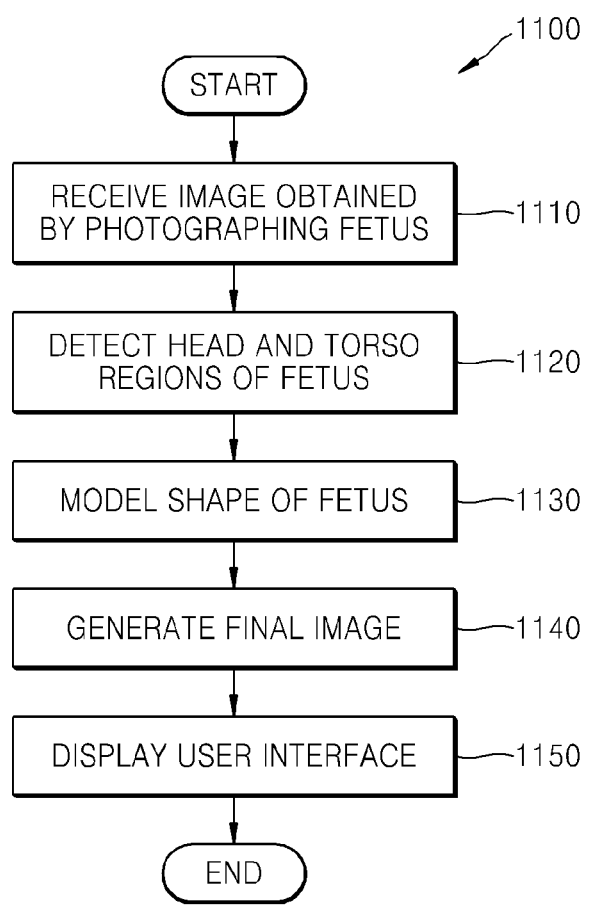
FIG. 11 is a flowchart which illustrates a method for modeling a fetus, according to another exemplary embodiment.

FIG. 11 is a flowchart which illustrates a method 1100 for modeling a fetus, according to another exemplary embodiment. The method 1100 has the same technical spirit as the image processing apparatus 200 according to another exemplary embodiment, which has been described above with reference to FIGS. 2 to 8. Thus, a description provided with respect to FIGS. 2 to 8 is not repeated. In addition, hereinafter, the method 1100 is described with reference to the image processing apparatus 200 of FIG. 2. In addition, because each of operations 1110, 1120, and 1130 of the method 1100 of FIG. 11 respectively corresponds to operations 910, 920, and 930 of the method 900 of FIG. 9, a description thereof is not repeated.

The method 1100 may further include at least one of operations 1140 and 1150, as compared with the method 900.

Referring to FIG. 11, after operation 1130, in operation 1140, a final image is generated by adding at least one of anatomical information relating to the fetus and at least one physical feature point relating to the fetus to a shape of the fetus which is modeled in operation 1130. Operation 1140 may be performed by using the controller 220, in particular, the fetus modeler 235.

In operation 1150, a user interface screen which includes any one of the shape of the fetus which is modeled in operation 1130 and the final image generated in operation 1140 is displayed. Operation 1150 may be performed by using the display 250, in particular, the user interface 255.

In detail, when the user interface screen which includes the final image is displayed in operation 1150, the displayed user interface screen may include a tool bar which is usable for measuring biometric data based on at least one of the anatomical information relating to the fetus and the at least one physical feature point relating to the fetus which is included in the final image. In addition, the displayed user interface screen may further include a cursor which is usable for designating a predetermined region of the fetus or for selecting a predetermined position of the fetus.

As described above, the fetus modeling method and an image processing apparatus according to an exemplary embodiment or another exemplary embodiment may uniformly model a physical shape of a fetus by modeling a shape of the fetus using a first spherical shape and a second spherical shape. Accordingly, by using the modeled shape of the fetus, biometric data relating to the fetus may be automatically measured, or a predetermined part of the fetus may be automatically detected. Thus, the biometric data relating to the fetus may be more easily acquired than in a case where a medical practitioner manually measures biometric data by using a fetus capturing image.

In addition, the fetus modeling method according to the exemplary embodiments described above can also be embodied as computer-readable codes or programs on a transitory or non-transitory computer-readable recording medium. The computer-readable recording medium may include any data storage device that can store data which can be thereafter read by a computer system. Examples of the computer-readable recording medium include read-only memory (ROM), random-access memory (RAM), compact disk—ROM (CD-ROMs), magnetic tapes, hard disks, floppy disks, flash memory, optical data storage devices, and any other suitable medium. The computer-readable recording medium can also be distributed over network coupled computer systems so that the computer-readable code is stored and executed in a distributed fashion.

The above description merely includes exemplary embodiments of the present inventive concept, and will be implemented by one of ordinary skill in the art in modified forms without departing from the intrinsic attributes of the present inventive concept. Therefore, the scope of the present disclosure is not limited to the exemplary embodiments described above, and will be analyzed to include various forms within the scope defined by the following claims.

What is claimed is:

1. An image processing apparatus comprising:
    an image receiver which receives a predetermined image obtained by photographing a fetus; and
    a controller which detects a head region and a torso region of the fetus from the predetermined image, and which models a shape of the fetus by using at least one of a first contoured shape which corresponds to the detected head region, a second contoured shape which corresponds to the detected torso region, a first axis that is a central axis of the detected head region, and a second axis that is a central axis of the detected torso region,
    wherein the controller generates a final image by adding at least one from among anatomical information relating to the fetus and at least one physical feature point included in at least one of the detected head region and the detected torso region to the modeled shape of the fetus.

2. The image processing apparatus of claim 1, wherein the controller comprises:
    a region detector which detects the head region and the torso region of the fetus from the predetermined image; and
    a fetus modeler which sets each of the first axis and the second axis and which models a shape of the fetus by using at least one of the first axis, the second axis, the first contoured shape, and the second contoured shape.

3. The image processing apparatus of claim 1, wherein the first contoured shape includes a circle, and the second contoured shape includes an oval.

4. The image processing apparatus of claim 2, wherein the region detector acquires edge information from the predetermined image and detects the head region and the torso region of the fetus by using the acquired edge information.

5. The image processing apparatus of claim 2, wherein the fetus modeler models a fitting of the first contoured shape to the detected head region as a head of the fetus and models a fitting of the second contoured shape to the detected torso region as a torso of the fetus.

6. The image processing apparatus of claim 2, wherein the fetus modeler sets the first axis by using at least one physical feature point included in the detected head region.

7. The image processing apparatus of claim 6, wherein the at least one physical feature point includes at least one of a palatine bone, a nasal bone, a cheekbone, and a crown of a head of the fetus.

8. The image processing apparatus of claim 7, wherein the fetus modeler sets a central axis of the first contoured shape, which is perpendicular to the palatine bone included in the head of the fetus, as the first axis.

9. The image processing apparatus of claim 1, wherein the first contoured shape includes at least one of a circle, a symmetrical oval, and an asymmetrical oval, and the second contoured shape includes at least one of a circle, a symmetrical oval, and an asymmetrical oval.

10. The image processing apparatus of claim 1, wherein the controller acquires at least one piece of biometric data by using the modeled shape of the fetus.

11. The image processing apparatus of claim 10, wherein the controller measures at least one of a biparietal diameter (BPD), a head circumference (HC), a femur length (FL), a humerus length (HL), and a crown rump length (CRL) by using at least one of the modeled shape of the fetus, anatomical information relating to the fetus, and at least one physical feature point included in at least one of the detected head region and the detected torso region, and outputs a measurement result.

12. The image processing apparatus of claim 1, further comprising a display which displays at least one of the modeled shape of the fetus and the final image under a control of the controller.

13. The image processing apparatus of claim 1, wherein the display further comprises a user interface which generates a user interface screen which includes the final image, and
    the user interface screen further includes a tool bar which is usable for measuring biometric data based on at least one of the anatomical information and the at least one physical feature point included in the final image.

14. The image processing apparatus of claim 13, wherein the user interface screen includes a cursor which is usable for at least one of designating a predetermined region of the fetus and selecting a predetermined position of the fetus.

15. A method for modeling a fetus, comprising:
    receiving a predetermined image obtained by photographing the fetus;
    detecting a head region and a torso region of the fetus from the predetermined image;
    modeling a shape of the fetus by using at least one of a first contoured shape which corresponds to the detected head region, a second contoured shape which corresponds to the detected torso region, a first axis that is a central axis of the detected head region, and a second axis that is a central axis of the detected torso region; and
    generating a final image by adding at least one from among anatomical information relating to the fetus and at least one physical feature point included in at least one of the detected head region and the detected torso region to the modeled shape of the fetus.

16. The method of claim 15, wherein the detecting comprises acquiring edge information from the predetermined image and separately detecting each of the head region and the torso region of the fetus by using the acquired edge information.

17. The method of claim 16, further comprising displaying a user interface screen which includes at least one of the modeled shape of the fetus and a final image.

18. The method of claim 15, wherein the modeling comprises:
modeling a fitting of the first contoured shape to the detected head region as a head of the fetus; and
modeling a fitting of the second contoured shape to the detected torso region as a torso of the fetus.

19. The method of claim 15, wherein the modeling further comprises setting the first axis by using at least one physical feature point included in the detected head region.

20. The method of claim 19, wherein the at least one physical feature point includes at least one of a palatine bone, a nasal bone, a cheekbone, and a crown of a head of the fetus, and
the setting of the first axis comprises setting a central axis of the first contoured shape, which is perpendicular to the palatine bone, as the first axis.

21. The method of claim 15, further comprising acquiring at least one piece of biometric data by using the modeled shape of the fetus.

22. The method of claim 21, wherein the acquiring comprises measuring at least one of a biparietal diameter (BPD), a head circumference (HC), a femur length (FL), a humerus length (HL), and a crown rump length (CRL) by using at least one of the modeled shape of the fetus, anatomical information relating to the fetus, and at least one physical feature point included in at least one of the detected head region and the detected torso region.

23. The method of claim 22, further comprising displaying a user interface screen which includes a value relating to the acquired at least one piece of biometric data.

24. The method of claim 15, further comprising displaying a user interface screen which includes the final image,
wherein the user interface screen further includes a tool bar which is usable for measuring biometric data based on at least one of the anatomical information and the at least one physical feature point included in the final image.

25. The method of claim 24, wherein the user interface screen further includes a cursor which is usable for at least one of designating a predetermined region of the fetus and selecting a predetermined position of the fetus.

* * * * *